(12) United States Patent
Klomp

(10) Patent No.: US 12,151,989 B2
(45) Date of Patent: Nov. 26, 2024

(54) MANURE PELLETS, AND PROCESS AND EQUIPMENT FOR MAKING THE SAME

(71) Applicant: Taurus-Global B.V., Amsterdam (NL)

(72) Inventor: Peter Klomp, Wanssum (NL)

(73) Assignee: TAURUS-GLOBAL B.V., Amsterdam (NL)

( * ) Notice: Subject to any disclaimer, the term of this patent is extended or adjusted under 35 U.S.C. 154(b) by 936 days.

(21) Appl. No.: 17/261,904

(22) PCT Filed: Aug. 2, 2019

(86) PCT No.: PCT/NL2019/050510
§ 371 (c)(1),
(2) Date: Jan. 21, 2021

(87) PCT Pub. No.: WO2020/027662
PCT Pub. Date: Feb. 6, 2020

(65) Prior Publication Data
US 2021/0292254 A1    Sep. 23, 2021

(30) Foreign Application Priority Data
Aug. 3, 2018 (NL) .................. 2021420

(51) Int. Cl.
*C05F 3/00* (2006.01)
*B30B 11/28* (2006.01)
*C05F 3/06* (2006.01)
*C05G 5/14* (2020.01)
*C05G 5/30* (2020.01)
(Continued)

(52) U.S. Cl.
CPC ............... *C05F 3/00* (2013.01); *B30B 11/28* (2013.01); *C05F 3/06* (2013.01); *C05G 5/14* (2020.02); *C05G 5/30* (2020.02); *F26B 3/08* (2013.01); *F26B 5/14* (2013.01); *F26B 23/022* (2013.01); *F26B 2200/12* (2013.01)

(58) Field of Classification Search
None
See application file for complete search history.

(56) References Cited

U.S. PATENT DOCUMENTS

| | | | |
|---|---|---|---|
| 4,156,384 | A | 5/1979 | Hinds, Jr. et al. |
| 5,730,772 | A | 3/1998 | Staples |
| (Continued) | | | |

FOREIGN PATENT DOCUMENTS

| | | |
|---|---|---|
| CA | 2196443 A1 | 7/1998 |
| CN | 107715554 A | 2/2018 |
| (Continued) | | |

OTHER PUBLICATIONS

European Patent Office Communication, Application No. 19 756 015.4, dated Oct. 27, 2023, pp. 5.

*Primary Examiner* — Wayne A Langel
(74) *Attorney, Agent, or Firm* — Hoffmann & Baron LLP

(57) ABSTRACT

A pellet made of dried, unfermented livestock manure has N, P and K values in the range of N: 3 to 7 g/kg, as ammoniac and organic nitrogen, P: 2 to 6 g/kg as phosphorus pentoxide and K: 2 to 6 g/kg as potassium oxide (g/kg). The pellet has a hardness exceeding 10 kg and has a shell composed of manure-base lignin. A press roll, including a hollow rotatable drum with a perforated screen, may be used in combination with an endless belt and a scraper to produce the pellet.

18 Claims, 6 Drawing Sheets

(51) Int. Cl.
*F26B 3/08* (2006.01)
*F26B 5/14* (2006.01)
*F26B 23/02* (2006.01)

(56) References Cited

U.S. PATENT DOCUMENTS

| | | | |
|---|---|---|---|
| 2003/0167811 A1* | 9/2003 | Porubcan | C05F 3/00 |
| | | | 71/6 |
| 2006/0010713 A1 | 1/2006 | Bussmann et al. | |
| 2012/0234063 A1* | 9/2012 | Burnham | C05G 3/20 |
| | | | 71/12 |
| 2018/0086675 A1* | 3/2018 | Burchard | C05G 3/40 |

FOREIGN PATENT DOCUMENTS

| | | | | |
|---|---|---|---|---|
| DE | 102009005721 A1 | * | 5/2010 | B09B 3/00 |
| DE | 102016106746 A1 | * | 10/2017 | A61L 2/04 |
| EP | 805130 A2 | * | 11/1997 | C05F 3/00 |
| EP | 0932494 B1 | * | 8/1999 | B30B 11/20 |
| EP | 3 219 680 A1 | | 9/2017 | |
| NL | 198303338 A | * | 4/1985 | C05F 3/00 |
| WO | WO 9012771 A2 | * | 11/1990 | C05B 5/00 |
| WO | 2011/060126 A2 | | 5/2011 | |

* cited by examiner

MANURE PELLETS, AND PROCESS AND EQUIPMENT FOR MAKING THE SAME

CROSS-REFERENCE TO RELATED APPLICATIONS

This application is the National Stage of International Application No. PCT/NL2019/050510, filed Aug. 2, 2019, which claims the benefit of Netherlands Application No. 2021420, filed Aug. 3, 2018, the contents of which is incorporated by reference herein.

TECHNICAL FIELD

The present invention relates to manure pellets, i.e., pellets made of dried, in this case unfermented, livestock manure. More in particular the present invention relates to slow release manure pellets with high NPK values. In addition the present invention relates to a process for making the manure pellets. The process ensures that the pellets are hygienized and thus transportable without risk of bio contamination. Compared to conventional manure processing schemes unnecessary and costly transportation of manure liquids is avoided. Moreover, the present invention relates to an assembly that is suitable for making manure pellets using livestock manure, in particular manure from cows, horses, and pigs. Moreover, the present invention relates to the configuration of the press roll used in said assembly.

BACKGROUND ART

Manure is a valuable by-product of the livestock industry, e.g., from farms keeping mammalian animals, providing nutrients to plants, organic matter to soil and forming an essential element in the cycle of life. For instance, typical analysis of dried and pelleted manure reveals a nitrogen content (as ammoniac) of 4%, a phosphorus content (as phosphorus pentoxide) of 2%, and a potassium content (as potassium oxide) of 1%. Moreover, manure from livestock animals, like horses, cows, sheep, swine, rabbits and goats and similar mammalian animals have a rather high fibre content, comprising lignocellulosic material consisting of lignin, cellulose and hemicellulose. However, fresh livestock manure is rather unattractive and ineffective form of fertilisation.

Manure pellets comprise both organic raw materials as well as a range of nutrients, of which organic nitrogen, organic phosphate and organic potassium are the most important constituents. Commercial pellets are made both with standard NPK formulas and custom-made formulas adapted to special crop demands. They may be made from inorganic sources, and organic sources. The components in NPK can be produced separately and "blended" to create a desired nutrient ratio/grade. Examples of organic sources include manure, compost, blood meal, feather meal, bone meal, biosolids and wood ash. Dried manure tends to have a rather low NPK value. It is therefore considered more a soil improver than mineral fertilizer, given the high content of animal-derived organic matter. The same has been true for manure pellets, unless mixed with additives.

Most commercial manure pellets are made from fermented manure. During fermentation the fibre content in the livestock manure is reduced by degradation of the lignocellulosic material to mono-sugars. Production of these pellets is time-consuming and requires transport of manure, with risk of spreading livestock diseases. Moreover, the pellets made from fermented manure have low N, P and K values, have a low or absent content of fibrous material and disintegrate rather quickly. Slow release of the nutrients would be much more effective. Moreover, for soil improvement, pellets with retained structure of the fibrous material in the manure are preferred. Thus, there is a demand for manure pellets with high N, P and K values containing fibrous material, but with release more gradual than achieved with fresh, liquid or dried manure or pellets formed from fermented manure.

Moreover, there is a demand for a cost and energy efficient and environment friendly process and equipment, in particular mobile equipment, to turn manure into the new manure pellets without the need for export across distances, for instance to a central digestion hub. The cost and energy efficiency will be significantly enhanced by minimizing heat drying through the application of mechanical drying to levels below 45% moisture content.

From U.S. Pat. No. 5,730,772 a high nitrogen dried poultry manure fertilizer is known. However, as every visitor to a farm can confirm, the consistency and composition of poultry manure is significantly different from that of livestock manure. Livestock manure comprises significant amounts of lignin, poultry manure does not. The conditions at which poultry manure can be treated are therefore different from that of livestock manure (that might actually incinerate at the mentioned temperature ranges).

US20060010712 discloses systems and methods for conversion of manure to fertilizer and/or soil builder products useful as input for organic farming operations. It is preferred that the manure feedstock be as fresh as possible with a high moisture content. The high water content facilitates mechanized handling of the raw material and preparing it for use by blending and mixing for uniformity of feedstock. The process comprises thermal conversion, chemically or physically, of the organic matter in the manure feedstock. This converted material can act as binder. This process is economically less attractive due to the employed drying steps. Moreover, this process makes use of an extrusion pelletizer which will result in pellets that have a moisture content of up to about 20% by weight or higher. These pellets must be dried to avoid growing mouldy. Moreover, the pellets will always be relatively soft and contain little if any fibrous material that was originally present. Thus the resulting pellets from the described process will be inferior in terms of internal lignin binding.

From WO2011060126 low-carbon fertilizers and processes for producing the same are known. The organic matter component is composted via a hot, thermophilic compositing process, at temperatures that are sufficiently high to kill pathogens present in the composting organic matter. This reference therefore fails to disclose a process specific to livestock manure and capable of producing pellets superior in composition of nutrients and fibrous materials and capable of slow release.

From EP3219680 a method of manure treatment is known comprising solid-liquid physical separation of a manure generating a solid and a liquid fraction. Pelletizing of the solid fractions obtained from the liquid fraction is disclosed, in the presence of lignicolous or lignocellulosic materials. This reference therefore focusses on the treatment of the liquid fraction rather than on the solid fraction of manure. Also the composition of the pellets so produced will be substantially different. For instance, the original fibrous material will be absent in the pellets so produced.

The inventors have addressed these demands for a slow release pellet that is excellent in N, P and K values, further containing fibrous material, and for a cost and energy efficient and environment friendly process and equipment. Moreover, the current equipment is also helpful to reduce the volume of livestock manure.

SUMMARY OF INVENTION

Accordingly a pellet is provided made of dried, unfermented livestock manure having N, P and K values in the range of N: 3 to 7 g/kg, as ammoniac and organic nitrogen, P: 2 to 6 g/kg as phosphorus pentoxide and K: 2 to 6 g/kg as potassium oxide (g/kg) having a hardness exceeding 10 kg and having a shell composed of manure-base lignin, preferably with a thickness of at least 33 micrometers. Moreover, this pellet has a fibrous content up to 65 wt % and organic content of up to 82 wt % both based on the weight of the pellet (without additives).

Also is provided an economically viable process for producing a manure pellet, wherein the manure is unfermented livestock manure, having a moisture content in the range of 10% to 18% and more preferable in the range of 12% to 16%, and wherein the manure is pelletized in a pellet mill, operating at a temperature in the range of 95-138° C., a pressure of 180 to 200 tonne/square centimeter, and a power in the range of 100 to 125 kW/tonne pellets. The combination of fibrous content, high pressure in the pellet mill and the controlled temperature in the same will result in a firm pellet with a strong lignin coating giving it the slow release features. Moreover, the pellets according to the present invention will have a distinguishing shiny appearance.

Also provided is equipment for making the pellets, either in the form of a stationary manure drying assembly or a mobile manure drying assembly.

The invention further provides a unique press roll, optimized for the manure drying assembly, but suitable for other operations too. The press roll entails tapered perforations in a hollow rotatable drum. The press roll comprises the drum and an endless belt passing below the drum. The press roll is essential in reducing the moisture content below 45% and thus greatly reducing the need for costly heat drying. Typically, a good performance of the press role will reduce the moisture amount to be evaporated per metric tonne of dry pellets from some 2,200 litres to less than 600 litres, thus saving some 1,650 kW in energy.

DESCRIPTION OF EMBODIMENTS

Figure 1:
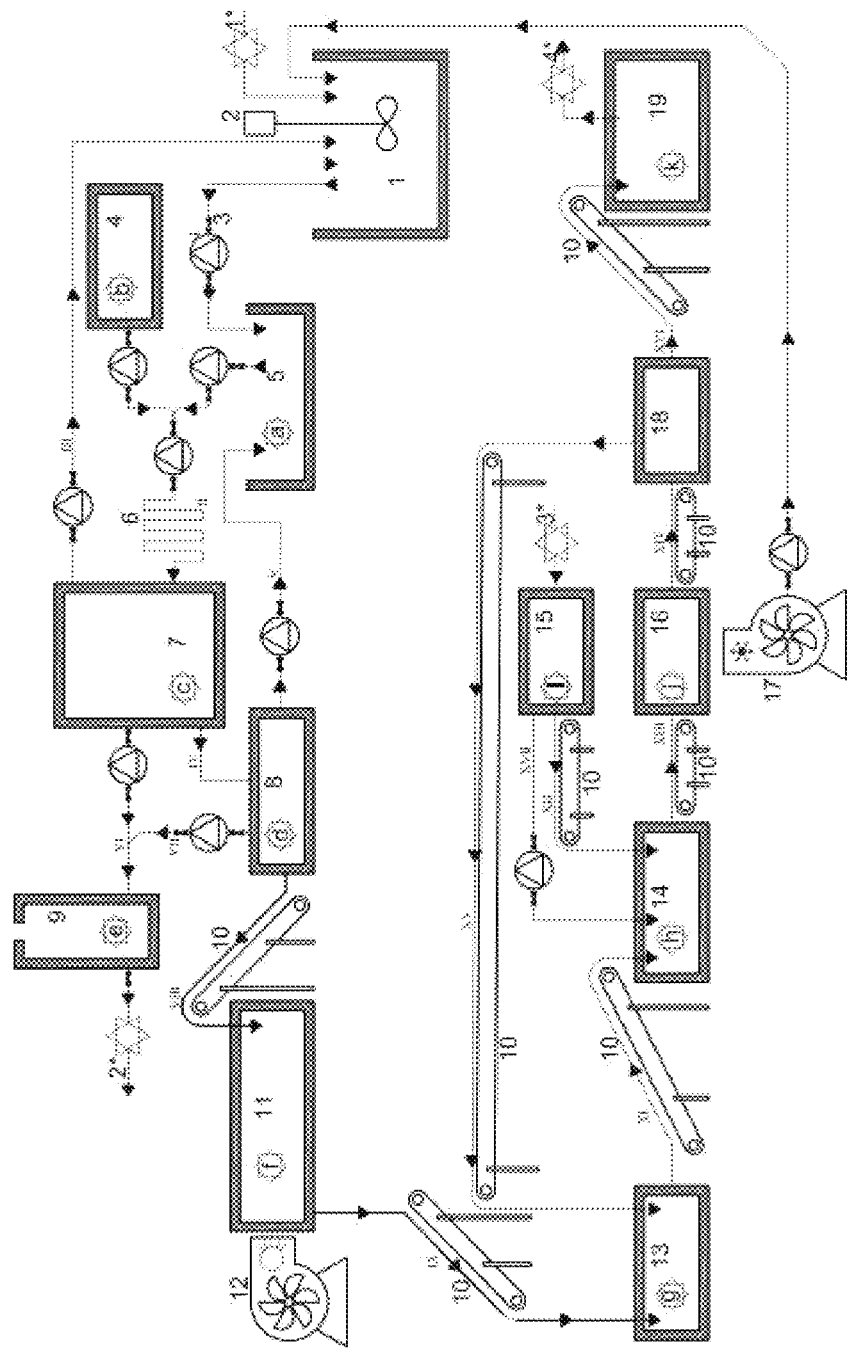
FIG. 1 is a flow scheme, providing schematic presentation of the assembly according to the present invention.

Manure pellets are known, and so is the process of making pellets from manure. A typical process involves pelletizing manure that has been removed from several farms, stored and fermented locally near the factory, and of which the moisture content has been reduced. A pellet mill is used to produce the pellets. Such pellets typically are relatively small and soft. Due to the fermentation process, there is little to no lignin present in the pellets. These existing pellets therefore quickly disintegrate and provide a short NPK boost.

The pellets of the present invention are different and novel, in that they are produced from livestock manure taken directly from the holding tanks at the farms. Thus, there is no fermentation of the manure. The content of fibrous material in the pellet is therefore relatively high, preferably in an amount of up to 65 wt % and the organic content is high too, preferably up to 82 wt % both based on the weight of the pellet (without additives) The manure may be based on cow dung, but also dung from horses, pigs and other plant-eating mammalian animals.

The pellets are preferably made in a continuous process from fresh manure that is conditioned and mechanically pre-dried in the traditional way and then squeeze-dried with the unique press roll and then heat-dried with for instance a contact dryer or a dryer used in sludge treatment plants. Properly squeeze-dried and heat-dried manure has the right consistency to allow the preparation of high NPK pellets that moreover degrade more slowly and release more slowly their nutrients due to the combination of the unfermented fibrous components in the squeeze-dried and heat-dried manure. The combination of squeeze drying followed by heat drying is economically much more attractive. Moreover, the combination of squeeze drying followed by heat drying, if done appropriately, maintains the original high fibre content, comprising lignocellulosic material consisting of lignin, cellulose and hemicellulose. This sets the present invention apart from prior art processes, wherein the original organic fibrous material and its structure is lost. By maintaining a high lignin content, and by applying higher than common pressure during the final pelletizing step, the process is unique in that it may form a lignin-shell, which provides the pellets a distinguishing shiny appearance. Indeed, in the process of the present invention the lignin component in the manure is forced to form an outside shell around the pellet during the final pelletizing step, at a pressure of 180-200 tonnes/square centimeter in combination with a temperature of 95-138° C., thereby aiding in the slow release of the nutrients. The pellets are therefore distinguished from fermented manure pellets by the nature of the organic components (higher lignin content, which component disappears in fermentation processes) and by the lignin shell around the pellets, which is generally at least 33 micrometer thick.

The shell is therefore formed in the pellet mill, operating at a temperature in the range of 95-138° C., a pressure of 180 to 200 tonne/square centimeter, and a power in the range of 100 to 125 kW/tonne pellets. Using a feedstock wherein no lignin is present, for instance poultry manure, will not result in the desired shell. Using fermented livestock, wherein the fibre content in the manure is reduced by degradation of the lignocellulosic material to mono-sugars will not result in a lignin shell either. Finally, using a pelletizer operating below the above conditions will not "squeeze" the lignin to migrate and form a shell.

Figure 3:
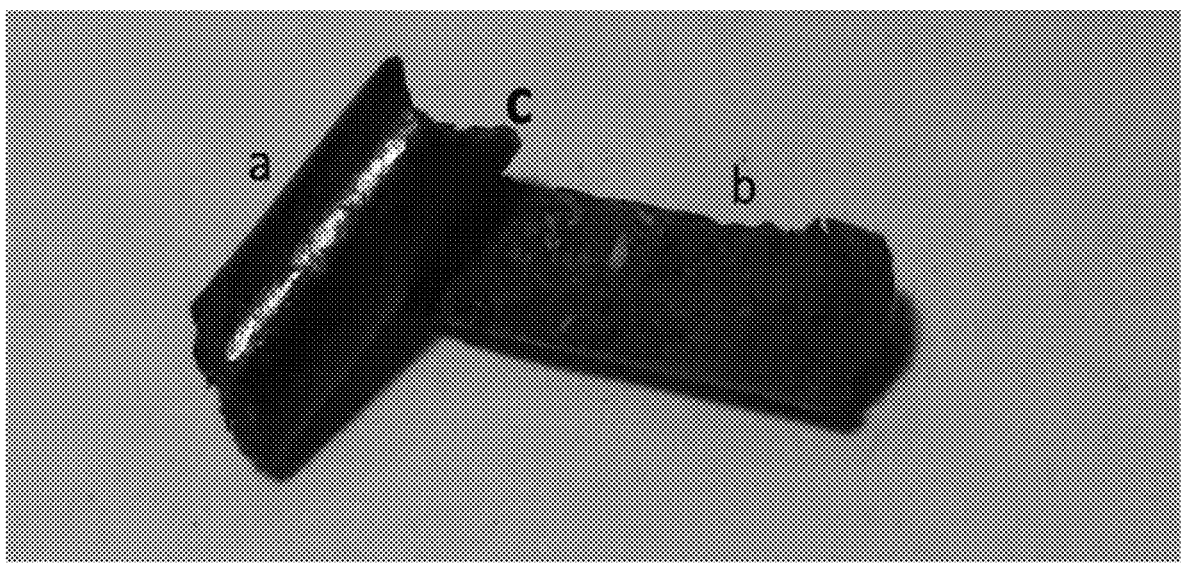
FIG. 3 comprises a series of photos of pellets of the present invention, revealing that they have a lignin-based shell.
Figure 4:
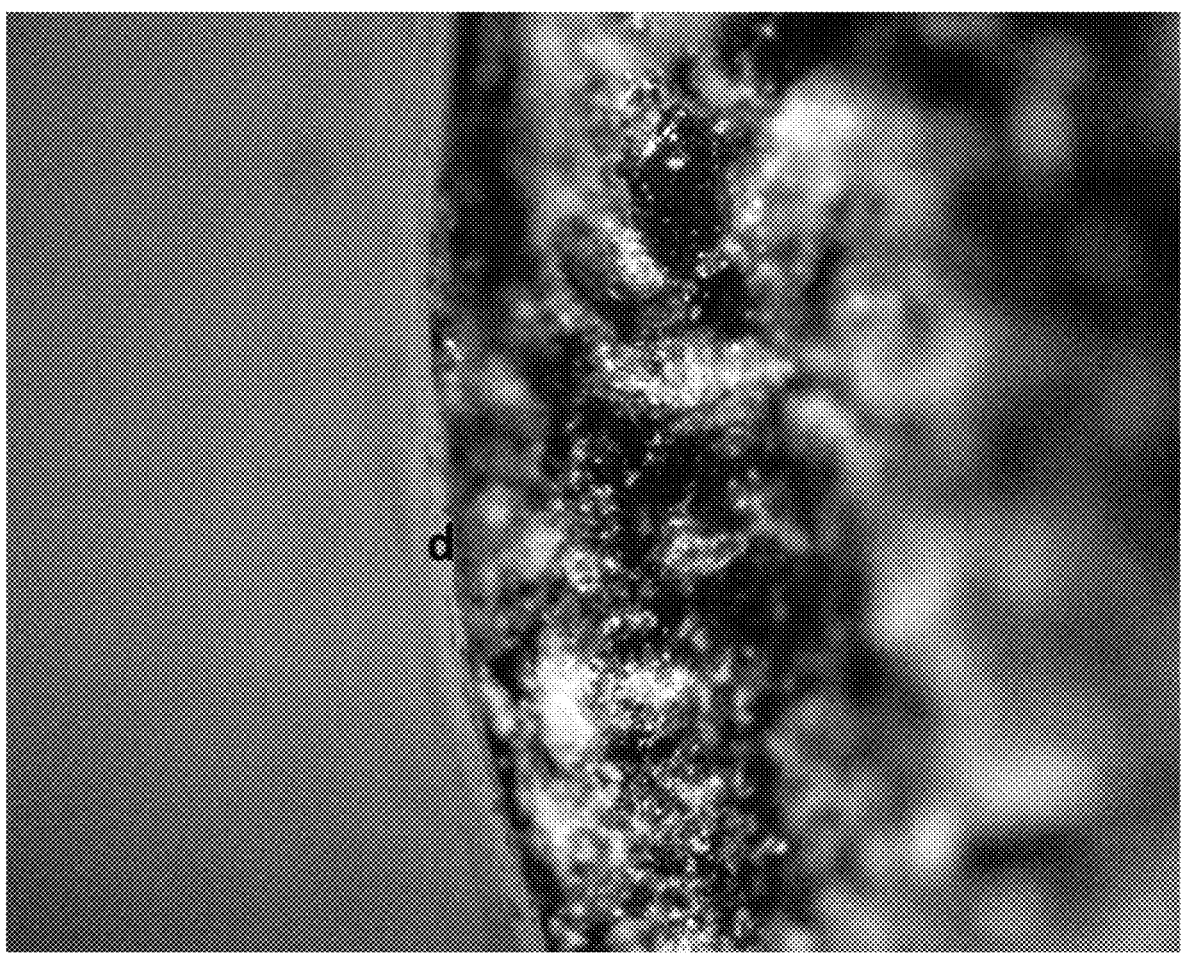
FIG. 4 comprises an enlargement of the pellet shown in FIG. 3.

The shell may have a thickness of 200 micrometer. On average the shell may have a thickness between 33 to 200, more preferably between 40 and 150, more preferably still, between 50 and 110 micrometer. The thickness of the shell can be determined with optical instrumentation, e.g., the use of a binocular (e.g. Zeiss Stemi DRC) in combination with a camera (e.g. AmScope MU1400). Pellets having a lignin shell with an average thickness greater than 200 micrometer are not preferred, as the pellets would release their nutrients too slowly. Moreover, the thicker the shell, the less volume is remaining for the nutrients in the pellets. Pellets with a shell smaller than 33 micrometer are not preferred as the improvement on release time vis-à-vis commercial manure pellets dwindles with smaller shell thickness. Pellets according to the present invention are shown in FIGS. 3 and 4.

By using unfermented, squeeze-dried and then heat-dried manure, moreover higher NKP values are obtained. In addition, both the heat-drying and the pelletizing ensure the production of hygienized pellets as demanded by the market. The NKP values may be in the range of N: 3 to 7 g/kg as ammoniac plus organic nitrogen, P: 2 to 6 g/kg as phosphorus pentoxide, and K: 2 to 6 g/kg as potassium oxide, even without use of other additives. The NKP values may be determined by common analytical methods used for commercial pellets. For instance, the NKP values may be determined by the methods used by Eurofins Agro Testing Wageningen BV.

In the pellets and thus in the process of the present invention, additives both of inorganic as well as organic nature may be used. For instance, the manure may be mixed with digestate. Digestate is the material remaining after the anaerobic digestion of a biodegradable feedstock. Digestate is produced both by acidogenesis and methanogenesis. Acidogenic digestate is fibrous and consists of structural plant matter including lignin and cellulose. Methanogenic digestate is a sludge (sometimes called a liquor). This is often high in nutrients such as ammoniums and phosphates. Both forms of digestate may be used in combination with the raw manure. Other sources of nutrients, of lignin, and of organic material may be added. If added, the amount of additives are preferably blended up to 12.5% by weight on the blend. However, as the use of additives adds to the complexity of the pellet and the process, this is not preferred. Moreover, it is preferred to have the pellets based solely on the unfermented manure, allowing it to be marketed as "pure". Although it is possible to make the pellets according to the present invention from manure that is transported from the farms to a central hub where it is converted into manure pellets, preferably the pellets are prepared locally, without the need for transport of the manure. As indicated above, transport of manure may increase the risk of spreading livestock diseases. The new pellets are therefore preferably made using an assembly scaled to produce the pellets locally, on the farm. This may be a stationary assembly, but for the average farm more preferably is a mobile assembly. Animal farms may produce a constant stream of manure justifying a stationary assembly. A mobile assembly is of particular interest, as the mobile assembly can be brought to a farm having sufficient manure for an operation run of making pellets. Upon completion of the operation run the assembly can be brought to the next farm, and so on. This makes the process economically much more attractive and avoids making manure management at the farms more complex: A farmer may simply contact a firm renting the mobile assembly to take care and get rid of his manure.

Note in this respect that it is possible, but not preferred, to use the squeeze and heat drying equipment of the manure drying assembly of the present invention for "mere" drying of the manure, without subsequent pelletizing. A pellet mill is preferably part of the mobile assembly, as this results in the commercially attractive and hygienized pellets.

Turning to the process, four steps may be recognized. The first step comprises the conditioning of the manure. The second step comprises the squeeze drying of the manure. The third step comprises the heat drying of the manure. The final step comprises the pelletizing and finishing step. Each of these steps, but in reverse order, is described below.

Turning to step four, it is of particular importance that the material that is pelletized has a water content in the range of 10 to 18% by weight, preferably 12 to 16% by weight. Should the moisture content be too low, then it is problematic to fill the pellet mill and pelletize the manure. Should the moisture content be too high, then it is problematic to form solid slow-release manure pellets. The pressure on the manure in the pellet mill may be insufficient to separate out the lignin therein and form a slow-release shell around the pellet. Moreover, as a significant part of the moisture is released in the pellet mill, this is a drain on the temperature and thus on the energy efficiency of the pellet mill. Preferably, the pellet mill is operating at a temperature in the range of 95-138° C., a pressure of 180 to 200 tonne/cubic centimeter, and a power in the range of 100 to 125 kW/tonne pellets, Pellets made in a pellet mill will have a high temperature. This is beneficial as it will hygienize the pellets. However, to control the process and avoid thermal decomposition of the shell of lignin formed in this step, some cooling of the pellets is preferred. Typically, after pelletization, the manure pellets of the present invention are collected for transport and sales, for instance in big bags.

As indicated, the manure pellets of the present invention are preferably made from manure that is first squeeze-dried and then heat-dried. As to the third step, any process of heat-drying may be used provided the moisture content is less than 60% by weight and more than 37% by weight, preferably less than 50% and more than 37%, more preferably less than 45% and more than 37% by weight. This may be done in a conventional drying oven or a dryer used in sludge treatment plants, possibly modified as required. The drying oven may operate e.g. on microwave or incineration. The latter is preferred, wherein—more preferably—the gaseous phase that is separated in the drying oven is recycled to the incinerator. This has the advantage that any odorous components are incinerated together with the fuel used in the incinerator. The drying oven is preferably part of the mobile assembly while in a stationary unit a dryer used in sludge treatment plants is preferred. In the latter case, an additional air washer may be required to handle the aforementioned odorous components.

Prior to step three the manure is squeeze dried, preferably to a moisture content of 37 to 60% by weight, preferably 37 to 50% by weight, more preferably 37 to 45% by weight. The combination of squeeze-drying and heat-drying ensures in an economically feasible manner the production of manure with the right moisture content for the pellet mill to be efficient. Moreover, the combination of squeeze-drying and oven-drying ensures a homogeneous consistency of moisture and organic matter. Moreover, the combination of squeeze-drying and heat-drying ensures that the organic matter in the manure does not degrade, thus ensuring that sufficient organic matter (lignin) remains to form strong, slow-release pellets.

Turning to the squeeze-drying step, step 2 of the process, of the unique press roll of the present invention may be used to squeeze the manure. In this regard it is to be noted that the consistency of manure may differ significantly. It differs from farm-to-farm, and obviously from animal to animal. Manure based on horse-dung may be relatively easy to squeeze-dry, whereas that of cow-dung may be more problematic.

The inventors devised a press roll that is particularly advantageous in the present invention. The press roll comprises a hollow rotatable drum with a perforated screen that is used in combination with an endless belt and a scraper. Its operation is unique, in that the squeeze-dried manure "sticks" to the drum rather than stay on the belt. Squeeze-dried manure is removed from the drum with use of the scraper and then passed on to the heat-drying step three of the process.

In its operation, the drum is placed such that it presses on the endless belt and the perforated screen by which manure is squeezed and allowed to pass through, whereas liquid manure is squeezed sideways.

The actual pressure depends on the nature and consistency of the manure fraction as discussed hereafter. The endless belt may be made of metal elements to withstand the pressure, preferably covered by a non-sticking layer. The layer may, for instance, be a rubber band.

This operation is a delicate interplay between the density and dimensions of the perforations in the screen of the drum, the diameter of the drum, the dry solids content of the manure and the amount of dried manure that is squeezed dry, and the pressure exerted on the dried manure. Hereafter these features are described by way of example, with no intent to limit the invention.

Likewise the pressure that is exerted on the dried manure fraction is important. If the pressure is insufficient, then the manure will not or not sufficiently stick to the drum. If the pressure is too great, then no manure will pass through. Moreover, this will cause drainage of the liquid manure fraction through the drum. The suitable pressure may be easily found by the skilled person. He or she may have to determine the most suitable pressure for a given type of manure and local conditions.

By way of example, preferably the average pressure exerted onto manure derived from cow dung may be at least 8 tonne. The hollow rotatable roll may contain additional internal structures to maintain its dimensions despite the force it exerts on the manure.

The size, form and density of the perforations of this new press roll are equally important. Preferably, the heart to heart distances of the perforations are on average between 6 and 12 millimeters, more preferably between 7 and 11 millimeters and most preferably between 8 and 10 millimeters. Preferably the perforations start about 10 cm away from the ends of the drum. The density of perforations may increase towards the middle of the drum. Furthermore, the perforations are preferably circular and tapered in form, with an outside diameter (on the outside of the screen) in the range of between 2.5 and 6.5 mm and an inner diameter (on the inside of the screen) in the range between 2 and 6 mm, more preferably an outside diameter (on the outside of the screen) in the range of between 3 and 6 mm and an inner diameter (on the inside of the screen) in the range between 2.5 and 5.5 mm, most preferably with an outside diameter between 3.5 and 5.5 mm and an inside diameter in the range between 3 and 5 mm.

The diameter of the press roll may vary for practical reasons between 0.30 and 0.60 meter, more preferably between 0.35 and 0.55 meter, most preferably between 0.40 and 0.45 meter. The length of the press roll is preferably about the same, approximately extending the width of the endless belt. However, variations in length are allowed. For a mobile assembly, the rolls may for instance be between 0.40 and 1.50 m in length, more preferably between 0.50 and 1.40 m in length, most preferably between 0.60 and 1.30 m in length.

The assembly may have a single press roll, or a number of press rolls, each being fed with a part of the manure. For a mobile assembly, preferably two to four press rolls are used, each being fed with half to a quart of the manure and placed each behind the other, making use of the same drainage channels for the liquid manure fraction that is separated in this step. Likewise the squeeze-dried solid manure fraction is collected and combined for the heat-drying step three.

The manure is preferably evenly fed to the press roll(s), for instance using a vibrating belt with a distributor that uploads the manure onto the endless belt. If several press rolls are used, then preferably a divider is used for dividing the manure prior to squeeze drying. If the press rolls are placed in line, then preferably the same endless belt is used passing below each of the press rolls.

For proper performance of the invention, using the press roll defined herein before, it is essential that the dry solids content of the manure fed to the press roll(s) is between the 15 and 28%, more preferably between the 16 and 26%, most preferably between the 17 and 25%. Outside this range the press roll may not function properly. If the solids content is too low or too high, then the manure will not stick to the drum. Of equal importance is the throughput of the manure, which is a function of the speed, and width of the endless belt and the pressure of the drum on the endless belt. Based on the conditions set out above, throughput is preferably 200 to 600 kg/hr, more preferably 250 to 550 kg/hr, most preferably 300 to 500 kg/hr.

In a preferred embodiment of the process of the present invention, the moisture content of the manure prior to the squeeze-drying step 2 is brought in step 1 to a moisture content in the range of 72 to 85%, more preferably between the 74 and 84%, most preferably between the 75 and 83% by weight. This may be done with a decanter or belt filter press. Ideally, the decanter or belt filter press is also part of the assembly. Prior to this, the manure may be homogenized and, if necessary, treated to remove objects foreign to manure (e.g., stones, branches, keys, etc., that may have dropped inadvertently into the holding tanks of the manure). At this step also various additives like digestate, minerals, lignin and other additives may be added.

Moreover, preferably the manure is taken from the holding tank at a farm and first homogenized in a collecting bin. Here part of the moisture which is separated in the subsequent drying steps, decanter or belt filter press, press roll and/or drying oven, may be used to bring the manure to the above moisture level. Using part of the moisture from the subsequent drying steps has the advantage that the minerals that would be wasted otherwise may be collected by the solids in the manure and end up in the manure pellets of the present invention.

The invention may be illustrated by the flow scheme of FIG. 1, which schematically shows the preferred embodiment of the invention. In this embodiment various monitoring devices (a) to (l) are included, which are optional, but preferred. Their output helps controlling the process. Moreover, in this embodiment an ammonia scrubber 9 is included. For the purpose of the invention an ammonia scrubber is not essential, but a rather practical solution to facilitate the disposal of the liquid waste stream of the present process.

What follows is a description of the invention, with reference to FIG. 1. Measured quantities of manure (1*) are collected in a holding tank (1) equipped with a suitable mixing device (2) and pumped as mixed manure (I) with a pump (3) into a collecting bin (5) of which the content level is monitored by (a). From the collecting bin (5) manure (II) to which organic or inorganic additives may be added from a bin (4) monitored by device (b) is pumped through a flocculator (6) into a decanter or belt filter press (7) monitored by (c). The liquid fraction (III) from the decanter or belt filter press (7) is, at least in part, sent to the same or a different holding tank and/or is transferred (VI) to an ammonia scrubber (9). The manure (less the liquid fraction) (IV) is then sent to the drum press (8) (or presses), which is (or are) monitored by device (d) where it is squeeze-dried to the desired moisture content. The liquid fraction (V) from the press roll(s) is recycled to the collecting bin (5) and/or transferred (VII) to an ammonia scrubber (9). The ammonia scrubber (9) is monitored by device (e) and delivers a measured quantity (2*) of liquid manure which may be used for instance for fertilizing the land. The squeeze dried manure (VIII) is then taken to the drying oven or any other suitable drying assembly (11), monitored by device (f). Heat is provided by a heater (12) to which an air scrubber is added for the fumes or the fumes are recycled through the furnace. Shown here is a continuous drying oven fed with manure (VIII) using a transport unit (10) and from which the oven-dried manure (IX) is taken, again using a transport unit (10) and transported into a bunker (13) of which the content level is monitored by device (g). From the bunker (13) the dried manure (XI) is fed into a pellet mill (14), monitored by device (h). Also shown is a cooling unit (16) supplied by fresh air from a blower (17) and monitored by device (j), a sieve (18) and a fill station (19). Fine material passing (XV) through the sieve may be recycled to the bunker (13).

Additional minerals and/or other additives may be added to the pellet mill. Measured quantities of additives (3*) are stored in a bin (15). Monitored by device (i) additives may be added in liquid (XVII) or solid (XII) form to the pellet mill (14). At the fill station (19) marketable output (4*) is produced in bags, bins or any other suitable container monitored by device (k).

Figure 2:
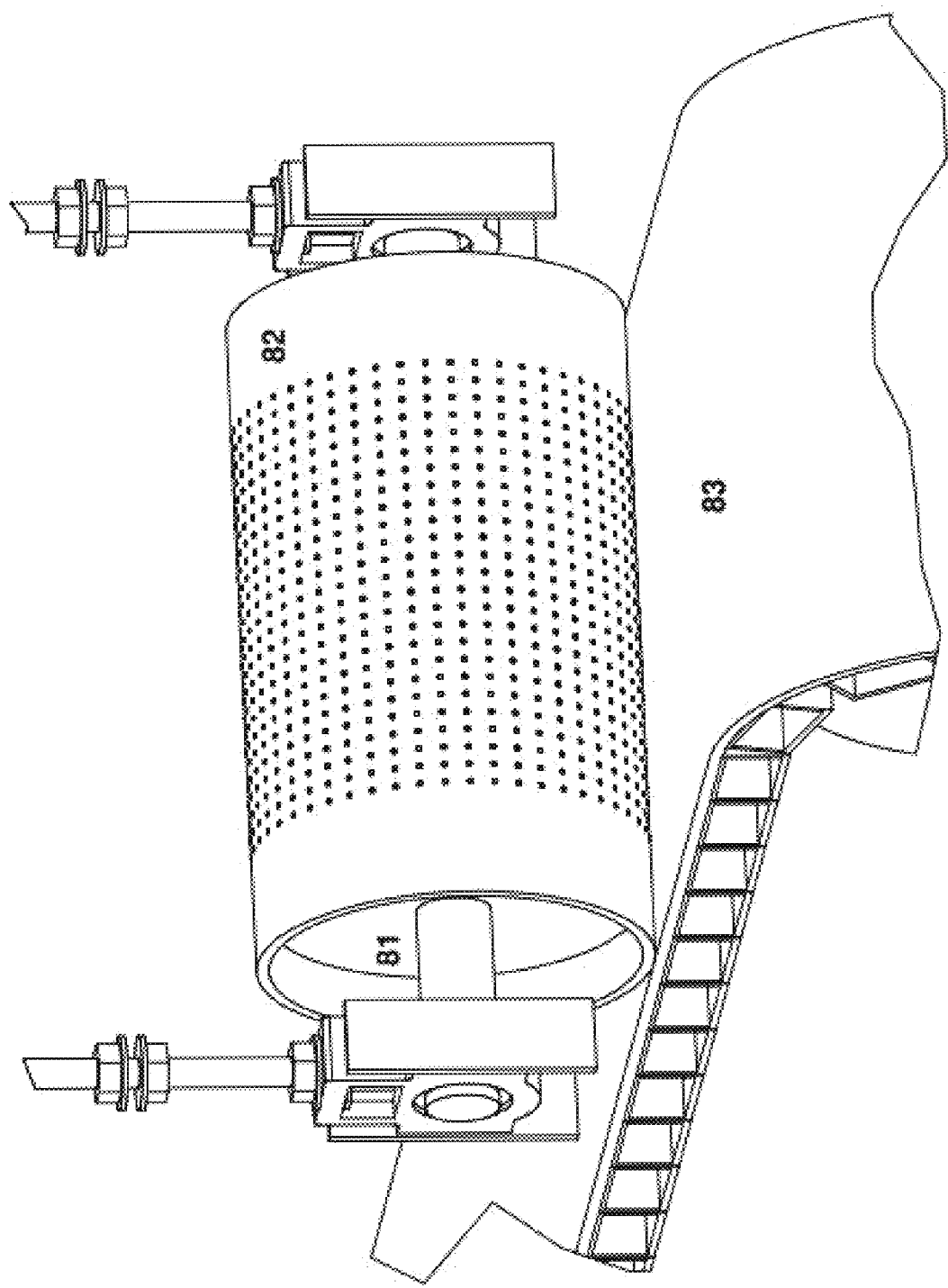
FIG. 2 is a schematic drawing of the drum press.

FIG. 2 shows a possible configuration of a press roll (8). Illustrated is a hollow rotatable drum (81) with a perforated screen (82) with perforations starting some distance away from the ends of the drum. The rotatable drum (81) presses onto an endless belt (83), provided with a non-sticking surface.

In addition to the pellets and the process for preparing the same, the present invention also relates to the equipment for providing the pellets, either in the form of a stationary assembly or a mobile assembly. The assemblies preferably comprise a collecting bin, a decanter, a press roll or rolls, a drying oven, a bunker, a pellet mill, a pellet cooler, a sieve and a fill station. In case of a mobile assembly, one or more of the above assembly components may be loaded on one or more wagons, with the remainder, if any, already stationary on the farm. The invention further relates to a novel press roll, comprising a hollow rotatable drum with a perforated screen with perforations starting some distance away from the ends of the drum, a scraper, and with an endless belt, preferably provided with and a non-sticking surface. Preferably, the novel press roll has the dimensions defined above, and is capable of operating at the conditions mentioned above.

FIG. 3, as mentioned above, comprises a series of photos of pellets of the present invention, revealing that they have a lignin-based shell. These are pellets made of cow dung which has been squeeze-dried, heat dried and properly pelletized to produce slow release pellets. In the top section the pellet marked "a" has a shiny surface, indicating the presence of a lignin coating. The longitudinal cross section of the pellet marked "b" in the same section is not shiny as further evidence that the lignin is forced to the outside surface of the pellet. In FIG. 4 a portion of the axial cross section of a pellet marked "c" in FIG. 3 is shown as photographed with optical instrumentation, e.g., the use of a binocular (e.g. Zeiss Stemi DRC) in combination with a camera (e.g. AmScope MU1400). The thickness of the lignin coating is clearly visible at mark "d".

Figure 5:
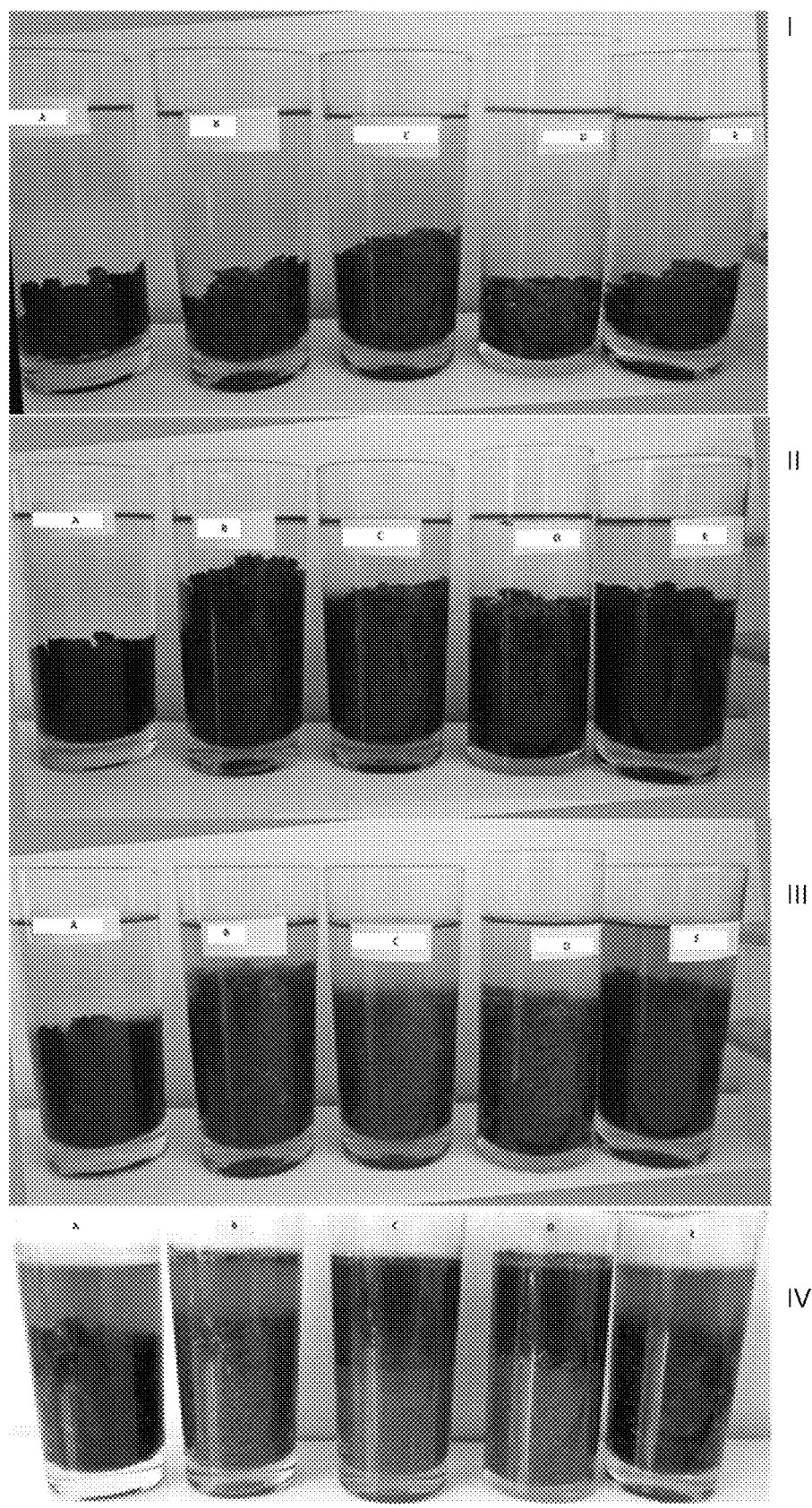
FIG. 5 comprises a series of photos of pellets kept in water during different periods of time.

FIG. 5 provides a series of photos that illustrate the slow release as well as the firmness of the present pellets, in comparison with state of the art pellets. In FIG. 5 the glasses are marked "A", "B", "C", "D" and "E" from left to right. Each glass contained 200 grams of water and 20 grams of pellets. The glass marked "A" contained the inventive pellets, whereas the other glasses contained commercially available pellets. The disintegration process is depicted starting at the top with picture I at the start of the test and then moving downwards picture II one hour after the start of the test, picture III one day after the start of the test and finally picture IV seven days after the start of the test.

Figure 6:
FIG. 6 comprises a photo of a pellet according to the present invention kept in water.

Whereas state of the art pellets will start disintegrating within one hour, see the photos in FIG. 5 II, III and IV on the right, a disintegration of the inventive pellets only occurred after more than seven days. Also FIG. 6 shows the inventive pellets retrieved eight days after the start of the wettability test described under the description of FIG. 5 above. Clearly there is disintegration visible, but also a significant part of the pellets the original shape of the pellets is recognizable.

Experiments

A pilot was conducted on a farm site using stored manure. Pellets were produced from the stored manure in accordance with the herein above described processes. In other words, the manure was first conditioned, and brought to a moisture content in the range of 75 to 83% by weight; then the manure was squeeze dried with the press roll of the present invention to a moisture content of 37 to 45% by weight, followed by a heat dry step resulting in a moisture content prior to pelletization of about 15% by weight and finally a pelletization step. The dried manure from the press rolls and the pellets were submitted for analyses to various laboratories.

NPK Values

The dried manure from the press roles was analysed by an eligible laboratory. The analysis on sample yielded the following results:

Dry material from the press roll: 449 (g/kg)
Nitrogen: 0.9 (g/kg) as ammoniac
Nitrogen: 5.1 (g/kg) as organic nitrogen
Phosphor: 4.6 (g/kg) as phosphorus pentoxide
Potassium: 3.3 (g/kg) as potassium oxide
Fibrous material: up to 650 (g/kg)
Organic material: up to 820 (g/kg)

Hardness

A pellet hardness tester made of a simple helical compression spring with a scale ranging from zero to 10 kg (this indicates how much kg pressure is needed to crush the pellet) was used to test the hardness of the subject pellets and compared with three different brands of commercially available pellets. The hardness tester was calibrated using various weights in the range from zero to 10 kg. Of each type of pellets 5 samples were tested.

The average hardness of the commercially available pellets was 3.9 kg with a standard deviation of 1.4 kg. The tested hardness ranged from 2.0 to 6.5 kg. The hardness of the subject pellets in all cases exceeded the 10 kg scale range.

Thickness of the Lignin Coating

Five samples of the subject pellets were prepared for measurements under a light microscope equipped with camera attached to a computer with appropriate software. The Zeiss Stemi DRC binocular was selected. The lignin thickness of each of the five samples was measured at two randomly selected points. See FIG. 3.

The thicknesses ranged from 33 to 109 micrometers with an average of 68 and a standard deviation of 25 micrometers.

Release Behaviour of the Pellets

Both the commercially available pellets and pellets according to the present invention were introduced in a glass of water at ambient temperature. The disintegration over time was monitored. Commercially available fermented cow dung pellets commenced disintegrating within one hour, had mostly disintegrated in one day. The pellets according to the present invention disintegrated more than six days later.

Evidence of the presence of fibrous material and organic material may be easily obtained using standard analytical tests. Moreover, the presence of fibrous material may be easily obtained by reviewing the material retained on a sieve after the above disintegration test. Comparison of the pellets according to the present invention will reveal a significantly higher content of fibrous material than commercially available pellets of fermented cow dung.

The invention claimed is:

1. A pellet made of dried, unfermented livestock manure having a high fibrous content up to 65% by weight based on the solid components of the livestock manure, comprising lignocellulosic material consisting of lignin, cellulose and hemicellulose, the pellets having N, P and K values in the range of N: 3 to 7 g/kg, as ammoniac and organic nitrogen, P: 2 to 6 g/kg as phosphorus pentoxide and K: 2 to 6 g/kg as potassium oxide (g/kg), having a hardness exceeding 10 kg and having a shell composed of manure-base lignin, wherein the shell has a thickness of at least 33 micrometers.

2. The pellet of claim 1, made from livestock manure based on cow dung, or dung from horses, pigs and other plant-eating mammalian animals, optionally comprising additives of inorganic and/or organic nature.

3. The pellet of claim 2, wherein the additive is digestate, preferably included in an amount up to 12.5% by weight on the blend of manure and digestate.

4. The pellet of claim 1, wherein the shell has a thickness of at least 33 to 200 micrometers.

5. The pellet of claim 1, made from manure that is first squeeze-dried and then heat dried before pelletization.

6. A process for producing the pellet of claim 1, wherein the manure is unfermented manure having a high fibrous content up to 65% by weight based on the solid components of the livestock manure, comprising lignocellulosic material consisting of lignin, cellulose and hemicellulose, having a moisture content in the range of 10% to 18% by weight, comprising:

pelletizing the manure in a pellet mill, operating at a temperature in the range of 95-138° C., a pressure of 180 to 200 tonne/cubic centimeter, and a power in the range of 100 to 125 kW/tonne pellets.

7. The process of claim 6, further comprising
a) a first step of conditioning the unfermented manure,
b) a second step of squeeze drying the manure,
c) a third step of heat drying the manure, and
d) a final step comprising pelletizing and finishing step the manure.

8. The process of claim 7, wherein in the second step manure is dried to a moisture content less than 45% by weight and more than 37% by weight.

9. The process of claim 8, wherein in the second step one or more press rolls are used, and wherein manure is dried having a dry solids content between the 15 and 28%.

10. The process of claim 9, wherein the throughput of the press roll or rolls is 200 to 600 kg/hr.

11. The process of claim 7, wherein in the third step manure is dried having a moisture content less than 45% by weight and more than 37% by weight to a moisture content in the range of 10% to 18% by weight.

12. The process of claim 11 wherein in the third step manure is dried, in a conventional drying oven or a dryer used in sludge treatment plants.

13. The process of claim 7, wherein in a first step the manure is brought to a moisture content in the range of 72 to 85% by weight.

14. The process of claim 7, further comprising:
utilizing a press roll comprising a hollow rotatable drum with a perforated screen in combination with an endless belt and a scraper, wherein
a) the press roll is capable of exerting pressure on manure up to at least 8 tonne,
b) the heart to heart distances of the perforations are on average between 6 and 12 millimeters, wherein the perforations start about 10 cm away from the ends of the drum
c) the perforations are circular and tapered in form, with an outside diameter (on the outside of the screen) in the range of between 2.5 and 6.5 mm and an inner diameter (on the inside of the screen) in the range between 2 and 6 mm, and
the diameter of the press roll varies between 0.30 and 0.60 meter, and the length of the press roll is preferably about the same, approximately extending the width of the endless belt.

15. The process of claim 8, wherein in the second step manure is dried using a press roll.

16. The process of claim 6 carried out in an assembly, comprising apparatuses selected from a group consisting of a collecting bin, a decanter, a drum press, a drying oven, a bunker, a pellet mill, a pellet cooler, a sieve station, and a fill station.

17. The process of claim 16, wherein the assembly is a mobile assembly, and wherein the apparatuses are loaded on one or more wagons.

18. The process of claim 6, wherein the manure has a moisture content in the range of 12 to 16% by weight.

* * * * *